(12) United States Patent
Parkila et al.

(10) Patent No.: US 8,746,764 B2
(45) Date of Patent: Jun. 10, 2014

(54) VEHICLE WITH FRONT IMPACT BEAM LATERAL LOAD TRANSFERRING MEMBER

(71) Applicant: GM Global Technology Operations LLC, Detroit, MI (US)

(72) Inventors: Magdalena M Parkila, Royal Oak, MI (US); Eduardo Barjud Bugelli, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/665,966

(22) Filed: Nov. 1, 2012

(65) Prior Publication Data

US 2014/0117717 A1    May 1, 2014

(51) Int. Cl.
*B60R 19/34* (2006.01)
(52) U.S. Cl.
USPC ............................................. 293/133
(58) Field of Classification Search
USPC .................... 293/102, 132, 133, 154
See application file for complete search history.

(56) References Cited

U.S. PATENT DOCUMENTS

| 3,708,195 | A | * | 1/1973 | Kottsieper | 293/125 |
| 3,820,834 | A | * | 6/1974 | Wilfert et al. | 293/150 |
| 3,823,968 | A | * | 7/1974 | Barenyi | 293/131 |
| 3,840,259 | A | * | 10/1974 | Barenyi | 293/150 |
| D245,597 | S | * | 8/1977 | Gee et al. | D12/169 |
| 5,100,189 | A | * | 3/1992 | Futamata et al. | 293/132 |
| 7,478,849 | B2 | * | 1/2009 | Fortin | 293/120 |
| 2004/0032133 | A1 | * | 2/2004 | Bird | 293/154 |

* cited by examiner

*Primary Examiner* — H Gutman
(74) *Attorney, Agent, or Firm* — Quinn Law Group, PLLC

(57) ABSTRACT

A vehicle includes a frame rail and an impact beam attached to an axial end of the frame rail. A body panel mount is attached to the frame rail. The body panel mount is axially spaced from the impact beam a distance along a longitudinal axis. A load transferring member includes a first axial end attached to one of the impact beam and the body panel mount, and a second axial end disposed adjacent to and a pre-defined distance from the other of the impact beam and the body panel mount. The load transferring member is disposed outboard of the frame rail. The load transferring member extends at an angle relative to the longitudinal axis between the impact beam and the body panel mount.

15 Claims, 3 Drawing Sheets

VEHICLE WITH FRONT IMPACT BEAM LATERAL LOAD TRANSFERRING MEMBER

TECHNICAL FIELD

The invention generally relates to a vehicle having a load transferring member for transferring an impact load applied to a distal end of a front impact beam to a longitudinally extending frame rail.

BACKGROUND

Vehicles include some form of a support structure, such as a chassis having a pair laterally offset frame rails. An impact beam is attached to a forward end of the frame rails, and often extends laterally outboard of the frame rails. In the event of a offset collision, in which an object contacts a distal end of the impact beam that is laterally offset outboard of one of the frame rails, the impact beam may bend or collapse around the axial end of the frame rail and not transfer the impact load to the adjacent frame rail.

SUMMARY

A vehicle is provided, and includes a primary support structure defining a longitudinal axis. The primary support structure includes a frame rail having an axial end, and extending along and laterally offset from the longitudinal axis. An impact beam is attached to the axial end of the frame rail. The impact beam is disposed transverse to the longitudinal axis, and extends outboard of the frame rail relative to the longitudinal axis to a distal end. A body panel mount is attached to the frame rail. The body panel mount is axially spaced from the impact beam a distance along the longitudinal axis. The body panel mount is disposed outboard of the frame rail relative to the longitudinal axis. A load transferring member includes a first axial end attached to one of the impact beam and the body panel mount, and a second axial end disposed adjacent to and a pre-defined distance from the other of the impact beam and the body panel mount. The load transferring member extends at a first angle relative to the longitudinal axis between the impact beam and the body panel mount.

A chassis for a vehicle is also provided. The chassis includes a primary support structure defining a longitudinal axis. The primary support structure includes a first frame rail and a second frame rail laterally offset from each other on opposing sides of the longitudinal axis. Each of the first frame rail and the second frame rail include a forward axial end. An impact beam is attached to the forward axial end of each of the first frame rail and the second frame rail. The impact beam is disposed transverse to the longitudinal axis. The impact beam extends outboard of the first frame rail relative to the longitudinal axis to a first distal end, and outboard of the second frame rail relative to the longitudinal axis to a second distal end. A first body panel mount is attached to the first frame rail. The first body panel mount is axially spaced from the impact beam along the longitudinal axis. The first body panel mount is disposed outboard of the first frame rail relative to the longitudinal axis. A second body panel mount is attached to the second frame rail. The second body panel mount is axially spaced from the impact beam along the longitudinal axis. The second body panel mount is disposed outboard of the second frame rail relative to the longitudinal axis. A first load transferring member includes a first axial end attached to one of the impact beam and the first body panel mount, and a second axial end disposed adjacent to and a distance from the other of the impact beam and the first body panel mount. A second load transferring member includes a first axial end attached to one of the impact beam and the second body panel mount, and a second axial end disposed adjacent to and a distance from the other of the impact beam and the second body panel mount. The first load transferring member extends at a first angle relative to the longitudinal axis between the impact beam and the first body panel mount, and the second load transferring member extends at a second angle relative to the longitudinal axis between the impact beam and the second body panel mount. The first load transferring member is operable to transfer both a longitudinal component and a lateral component of an impact load applied to the first distal end of the impact beam to the first frame rail. The second load transferring member is operable to transfer both a longitudinal component and a lateral component of an impact load applied to the second distal end of the impact beam to the second frame rail.

Accordingly, the load transferring members operate to transfer an impact load applied to a distal outboard end of the impact beam to one of the frame rails. In the event of a lateral offset collision between the impact beam and an object, in which in which the object contacts a distal end of the impact beam that is laterally offset outboard of one of the frame rails, the load transferring member disposed adjacent thereto transfers both a longitudinal component of the impact load and a lateral component of the impact load to one of the frame rails, to limit intrusion into a passenger compartment of the vehicle. Furthermore, the lateral component of the impact load transferred to the frame rail urges the vehicle laterally away from the object, while the longitudinal component of the impact load transferred to the frame rail slows the vehicle. In addition, the load transferring members help to absorb energy early during an impact, and thereby help to reduce the severity of vehicle deceleration.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, a vehicle is generally shown at 20. The vehicle 20 may include any shape, size, and/or style of vehicle 20 that includes a chassis 22, such as but not limited to a sedan, a sport utility vehicle 20, a truck, van, etc.

Figure 1:
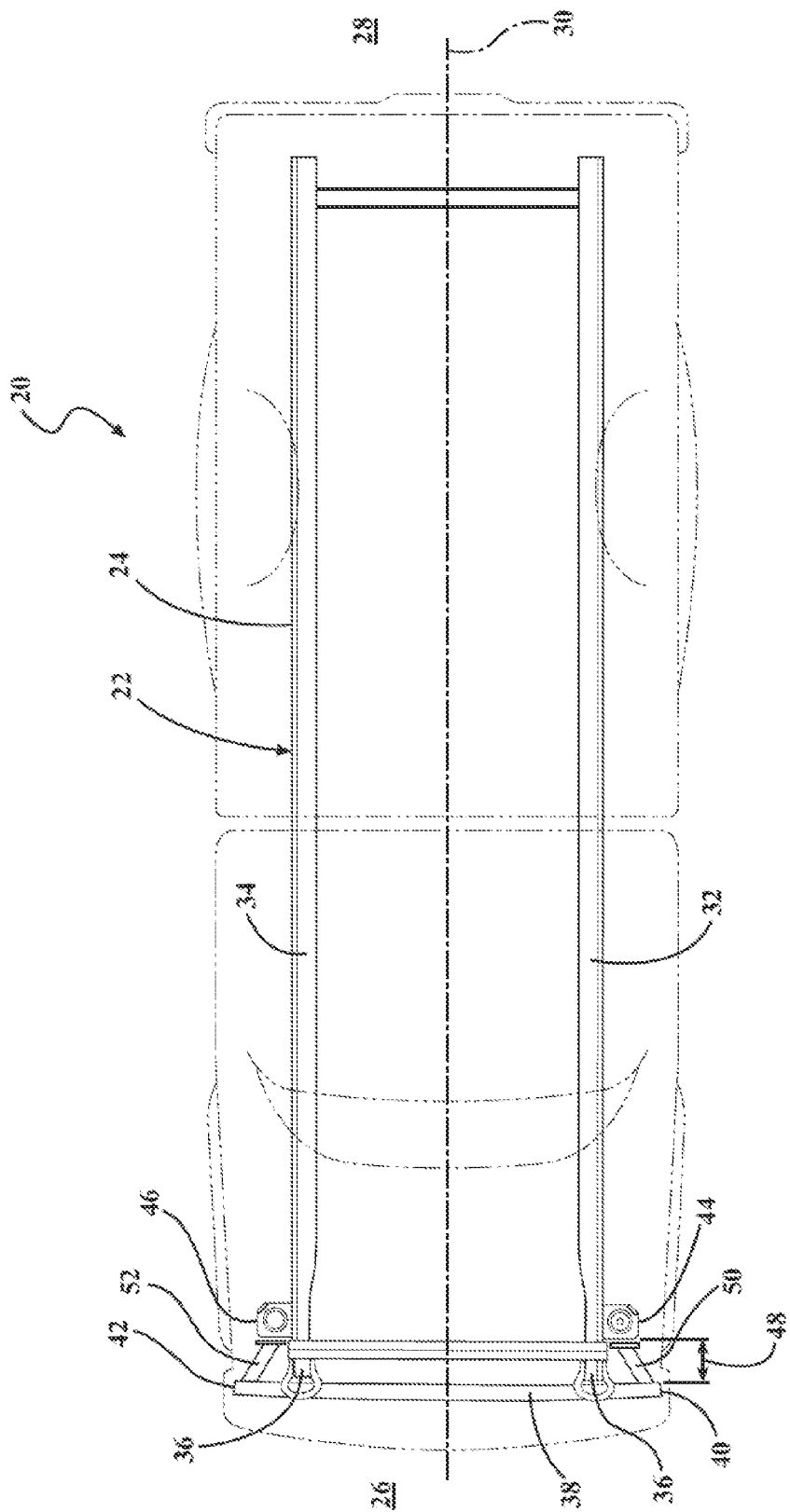
FIG. 1 is a schematic plan view of a vehicle showing a chassis of the vehicle.

Referring to FIG. 1, the chassis 22 of the vehicle 20 includes a primary support structure 24. The primary support structure 24 supports the various components of the vehicle 20, such as but not limited to the drivetrain, wheels, axles, body panels, etc. The primary support structure 24 includes a forward end 26 and a rearward end 28. The rearward end 28 is spaced from the forward end 26 along a longitudinal axis 30. The longitudinal axis 30 extends along a longitudinal center line of the vehicle 20. The primary support structure 24 includes a first frame rail 32 and a second frame rail 34. The second frame rail 34 is laterally offset from the first frame rail 32 on opposing lateral sides of the longitudinal axis 30. Each of the first frame rail 32 and the second frame rail 34 include a forward axial end 36 disposed at the forward end 26 of the primary support structure 24.

An impact beam 38 is attached to the forward axial end 36 of each of the first frame rail 32 and the second frame rail 34. The impact beam 38 is disposed transverse to the longitudinal axis 30. The impact beam 38 extends outboard of the first frame rail 32, relative to the longitudinal axis 30, to a first distal end 40. As used herein, the term "outboard" refers to a location relative to a center of the vehicle 20 along the longitudinal axis 30 that is located further away from an "inboard" location. As such, an inboard location is disposed nearer the center of the vehicle 20 relative to an outboard location, which is disposed farther from the center of the vehicle 20. The impact beam 38 extends outboard of the second frame rail 34, relative to the longitudinal axis 30, to a second distal end 42. The impact beam 38 may be attached to the first frame rail 32 and the second frame rail 34 in any suitable manner, such as but not limited to a bolted connection therebetween. The impact beam 38 operates to transmit frontal impact loads to the first frame rail 32 and the second frame rail 34 respectively.

The chassis 22 further includes a first body panel mount 44 and a second body panel mount 46. The first body panel mount 44 and the second body panel mount 46 are used to connect various body panels to the support structure 24. The first body panel mount 44 is attached to the first frame rail 32, and is axially spaced from the impact beam 38 along the longitudinal axis 30. The first body panel mount 44 is disposed outboard of the first frame rail 32 relative to the longitudinal axis 30. The first distal end 40 of the impact beam 38 is disposed farther outboard relative to the longitudinal axis 30 than is the first body panel mount 44. The second body panel mount 46 is attached to the second frame rail 34, and is axially spaced from the impact beam 38 along the longitudinal axis 30. The second body panel mount 46 is disposed outboard of the second frame rail 34 relative to the longitudinal axis 30. The second distal end 42 of the impact beam 38 is disposed farther outboard relative to the longitudinal axis 30 than is the second body panel mount 46. Each of the first body panel mount 44 and the second body panel mount 46 are spaced a distance 48 from the impact beam 38 along the longitudinal axis 30.

Figure 2:
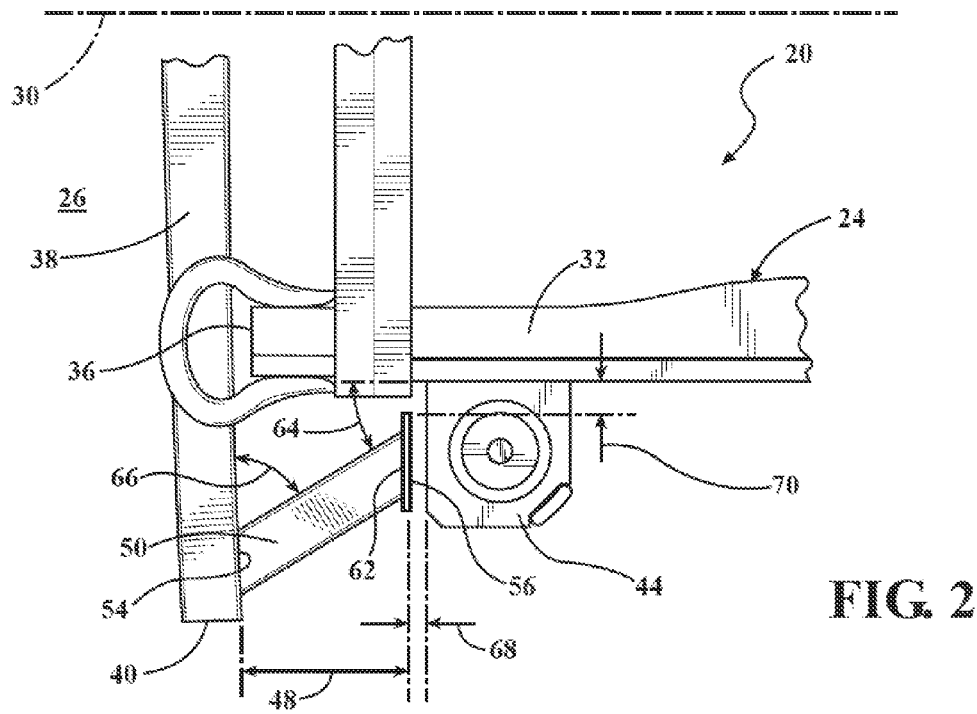
FIG. 2 is an enlarged schematic fragmentary plan view of the chassis showing a first load transferring member.
Figure 3:
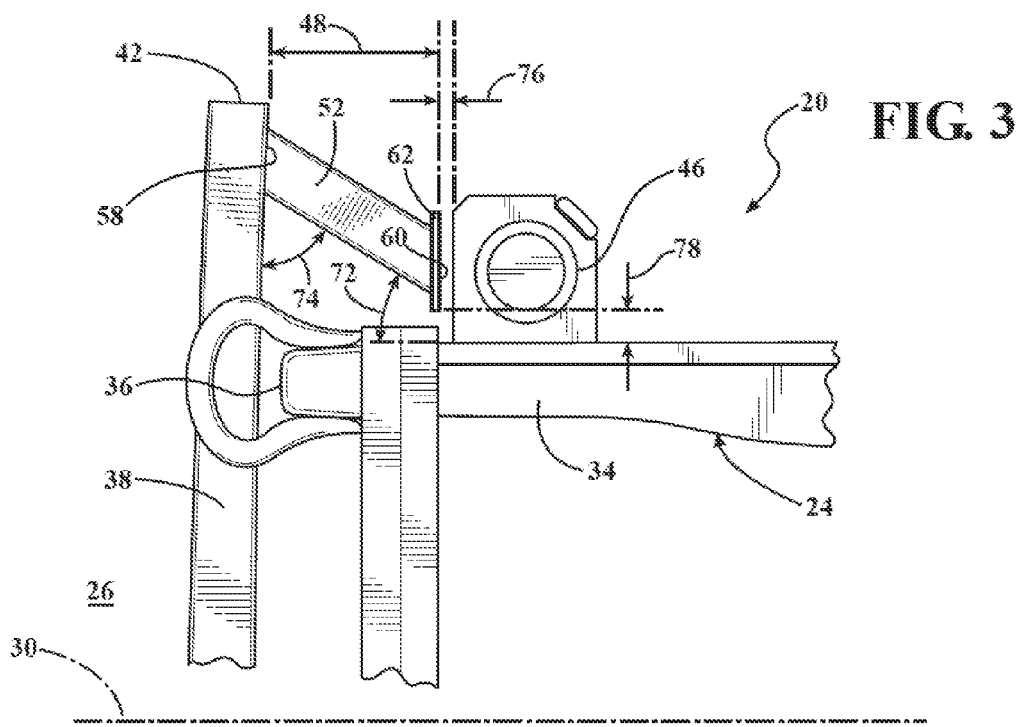
FIG. 3 is an enlarged schematic fragmentary plan view of the chassis showing a first load transferring member.

The chassis 22 further includes a first load transferring member 50 and a second load transferring member 52. The first load transferring member 50 and the second load transferring member 52 may include any suitable cross sectional shape, such as but not limited to a square tubular shape, a round tubular shape, a rolled channel shape, a solid bar, etc. Referring to FIG. 2, the first load transferring member 50 includes a first axial end 54 attached to one of the impact beam 38 and the first body panel mount 44, and a second axial end 56 disposed adjacent to and a distance 68 from the other of the impact beam 38 and the first body panel mount 44. As shown in the Figures, the first axial end 54 of the first load transferring member 50 is fixedly attached to the impact beam 38, and the second axial end 56 of the first load transferring member 50 is disposed adjacent to yet spaced from the first body panel mount 44. However, it should be appreciated that the relative position of the first load transferring member 50 may be reversed, with the first axial end 54 of the first load transferring member fixedly attached to the first body panel mount 44, and the second axial end 54 of the first load transferring member 50 disposed adjacent to yet spaced from the impact beam 38. Referring to FIG. 3, the second load transferring member 52 includes a first axial end 58 attached to one of the impact beam 38 and the second body panel mount 46, and a second axial end 60 disposed adjacent to and a distance 76 from the other of the impact beam 38 and the second body panel mount 46. As shown in the Figures, the first axial end 58 of the second load transferring member 52 is fixedly attached to the impact beam 38, and the second axial end 60 of the second load transferring member 52 is disposed adjacent to yet spaced from the second body panel mount 46. However, it should be appreciated that the relative position of the second load transferring member 52 may be reversed, with the first axial end 58 of the second load transferring member 52 fixedly attached to the first body panel mount 46, and the second axial end 60 of the second load transferring member 52 disposed adjacent to yet spaced from the impact beam 38.

Referring to FIGS. 2 and 3, wherein the first load transferring member 50 is shown in FIG. 2 and the second load transferring member 52 is shown in FIG. 3, each of the first load transferring member 50 and the second load transferring member 52 may include a plate 62 attached thereto. The plate 62 is attached to the second axial end 56, 60 of each of the first load transferring member 50 and the second load transferring member 52 respectively. The plate 62 distributes a load between the first and second load transferring members 50, 52 and the first and second body panel mounts 44, 46 respectively in the event of a frontal offset collision, described in greater detail below.

Referring to FIG. 2, the first load transferring member 50 extends at an angle relative to the longitudinal axis 30, between the impact beam 38 and the first body panel mount 44. The first load transferring member 50 and the first frame rail 32 define an angle 64 therebetween that is between the range of 30° and 45°. The first load transferring member 50 and the impact beam 38 define an angle 66 therebetween that is between the range 45° and 60°. As described above, the second axial end 56 of the first load transferring member 50 is spaced a pre-defined distance 68 from the first body panel mount 44. The pre-defined distance 68 between the second axial end 56 of the first load transferring member 50 and the first body panel mount 44 is between the range of 3 mm and 15 mm. Furthermore, the second axial end 56 of the first load transferring member 50 is laterally spaced a distance 70 from the first frame rail 32 that is equal to or less than 50 mm.

Referring to FIG. 3, the second load transferring member 52 extends at an angle relative to the longitudinal axis 30, between the impact beam 38 and the second body panel mount 46. The second load transferring member 52 and the second frame rail 34 define an angle 72 therebetween that is between the range of 30° and 45°. The second load transferring member 52 and the impact beam 38 define an angle 74 therebetween that is between the range 45° and 60°. As described above, the second axial end 60 of the second load transferring member 52 is spaced a pre-defined distance 76 from the second body panel mount 46. The pre-defined distance 76 between the second axial end 60 of the second load transferring member 52 and the second body panel mount 46 is between the range of 3 mm and 15 mm. Furthermore, the second axial end 60 of the second load transferring member 52 is laterally spaced a distance 78 from the second frame rail 34 that is equal to or less than 50 mm.

Figure 4:
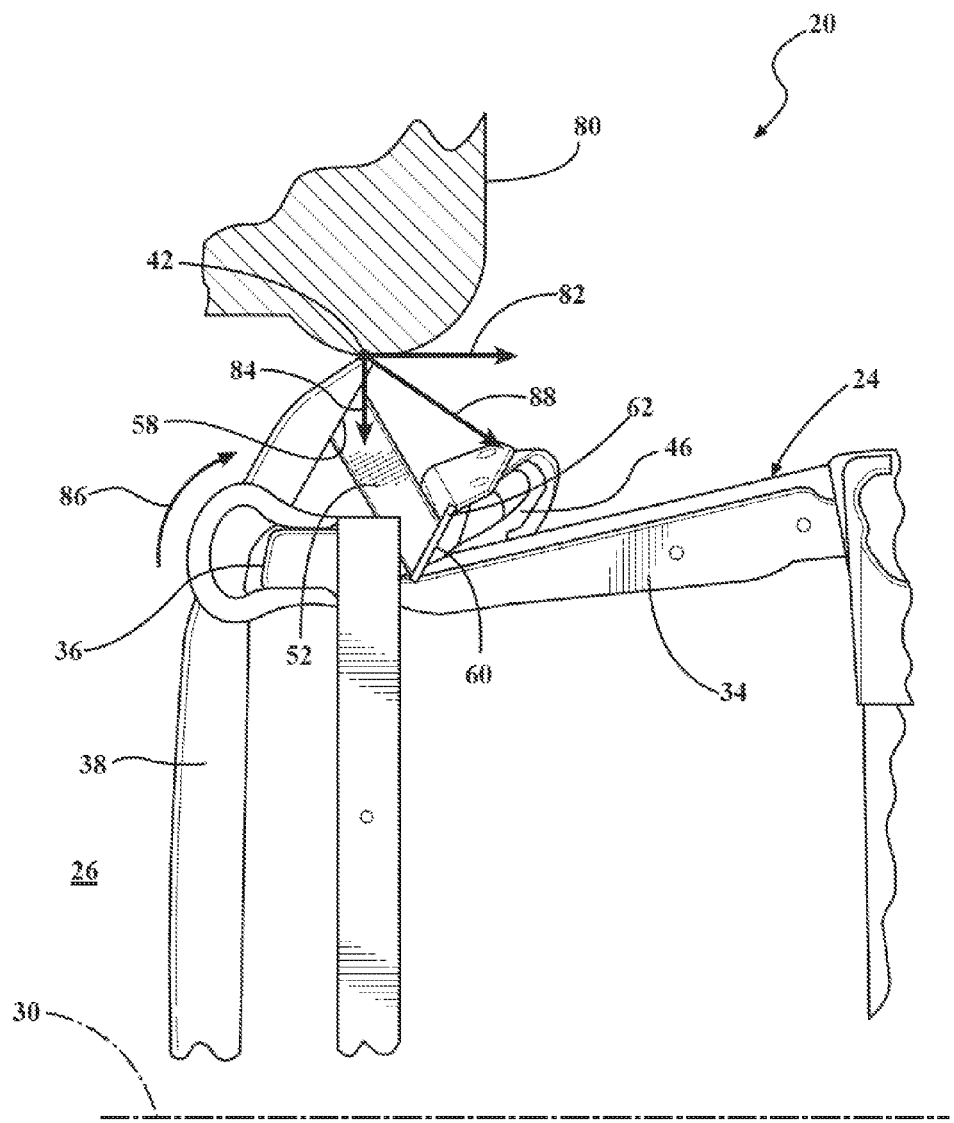
FIG. 4 is an enlarged schematic fragmentary plan view of the chassis showing force distribution during a collision event.

Referring to FIG. 4, in the event of a laterally offset collision, in which one of the first distal end 40 or the second distal end 42 of the impact beam 38 contacts an object 80, the first load transferring member 50 and the second load transferring member 52 are operable to transfer both a longitudinal component 82 and a lateral component 84 of an impact force 88 to the first frame rail 32 or the second frame rail 34 respectively, thereby allowing the first frame rail 32 and the second frame rail 34 to absorb the impact load respectively. While FIG. 4 only shows the second load transferring member 52 and the force distribution therefore, it should be appreciated that the first load transferring member 50 operates in a similar fashion on the opposing lateral side of the vehicle 20. The longitudinal component 82 of the impact force 88 is directed axially along the longitudinal axis 30 to slow the fore/aft movement of the vehicle 20. The lateral component 84 of the impact force 88 is directed transverse relative to the longitudinal axis 30, i.e., approximately perpendicular to the longitudinal axis 30, to force the vehicle 20 away from the object 80.

In the event of a lateral offset collision, in which the vehicle 20 contacts the object 80 with the second distal end 42 of the impact beam 38, the object 80 imparts an impact force 88 to the second distal end 42 of the impact beam 38, which causes the impact beam 38 to bend or collapse around the forward axial end 36 of the second frame rail 34 in a first rotational direction 86. As the second distal end 42 of the impact beam 38 collapses around the second frame rail 34, the second load transferring member 52 is moved across the pre-defined distance 76 separating the second axial end 60 of the second load transferring member 52 and the second body panel mount 46, and engages the second body panel mount 46 in abutting engagement. The second body panel mount 46 engages the second axial end 60 of the second load transferring member 52, and guides the second axial end 60 of the second load transferring member 52 in an inboard direction relative to the longitudinal axis 30, toward the second frame rail 34. The engagement between the second load transferring member 52 and the second body panel mount 46 restricts the second load transferring member 52 from moving axially along the longitudinal axis 30, thereby forcing the second axial end 60 of the second load transferring member 52 inboard toward and into engagement with the second frame rail 34, which closes the distance 78 separating the second axial end 60 of the second load transferring member 52 and the second frame rail 34. Because the second load transferring member 52 is angled relative to the second frame rail 34, the second load transferring member 52 transmits both the longitudinal component 82 of the impact force 88 and the lateral component 84 of the impact force 88 to the second frame rail 34. Accordingly, it should be appreciated that the relative values of the longitudinal component 82 and the lateral component 84 are dependent upon the angle 72, i.e., the angle between the second load transferring member 52 and the second frame rail 34.

Although not specifically shown in FIG. 4, it should be appreciated that the first load transferring member 50 operates in the same manner as the second load transferring member 52 described above. Specifically, in the event of a lateral offset collision, in which the vehicle 20 contacts the object 80 with the first distal end 40 of the impact beam 38, the object 80 imparts the impact force 88 to the first distal end 40 of the impact beam 38, which causes the impact beam 38 to bend or collapse around the forward axial end 36 of the first frame rail 32. As the first distal end 40 of the impact beam 38 collapses around the first frame rail 32, the first load transferring member 50 is moved across the pre-defined distance 68 separating the second axial end 56 of the first load transferring member 50 and the first body panel mount 44, and engages the first body panel mount 44 in abutting engagement. The first body panel mount 44 engages the second axial end 56 of the first load transferring member 50, and guides the second axial end 56 of the first load transferring member 50 in an inboard direction relative to the longitudinal axis 30, toward the first frame rail 32. The engagement between the first load transferring member 50 and the first body panel mount 44 restricts the first load transferring member 50 from moving axially along the longitudinal axis 30, thereby forcing the second axial end 56 of the first load transferring member 50 inboard toward and into engagement with the first frame rail 32, which closes the distance 70 separating the second axial end 56 of the first load transferring member 50 and the first frame rail 32. Because the first load transferring member 50 is angled relative to the first frame rail 32, the first load transferring member 50 transmits both the longitudinal component 82 of the impact force 88 and the lateral component 84 of the impact force 88 to the first frame rail 32. Accordingly, it should be appreciated that the relative values of the longitudinal component 82 and the lateral component 84 are dependent upon the angle 64, i.e., the angle between the first load transferring member 50 and the first frame rail 32.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
    a primary support structure defining a longitudinal axis, and including a frame rail extending along and laterally offset from the longitudinal axis and having an axial end;
    an impact beam attached to the axial end of the frame rail, wherein the impact beam is disposed transverse to the longitudinal axis, and extends outboard of the frame rail relative to the longitudinal axis to a distal end;
    a body panel mount attached to the frame rail and axially spaced from the impact beam along the longitudinal axis, wherein the body panel mount is disposed outboard of the frame rail relative to the longitudinal axis; and
    a load transferring member having a first axial end attached to one of the impact beam and the body panel mount, and a second axial end disposed adjacent to and a pre-defined distance from the other of the impact beam and the body panel mount;
    wherein the load transferring member extends at a first acute angle relative to the longitudinal axis between the impact beam and the body panel mount; and
    wherein the pre-defined distance between the second axial end of the load transferring member and the one of the impact beam and the body panel mount disposed adjacent the second axial end of the load transferring member is between the range of 3 mm and 15 mm.

2. A vehicle as set forth in claim 1 wherein the first angle is between the range of 30° and 45°.

3. A vehicle as set forth in claim 1 wherein the load transferring member and the impact beam define a second angle therebetween, and wherein the second angle is between the range 45° and 60°.

4. A vehicle as set forth in claim 1 wherein the first axial end of the load transferring member is attached to the impact beam, and the second axial end of the load transferring member is disposed adjacent the body panel mount.

5. A vehicle as set forth in claim 1 wherein the second axial end of the load transferring member is laterally spaced from the frame rail 50 mm or less.

6. A vehicle as set forth in claim 1 wherein the body panel mount engages the second axial end of the load transferring member and guides the second axial end of the load transferring member in an inboard direction relative to the longitudinal axis, toward the frame rail, in response to an impact load applied to the distal end of the impact beam bending the distal end of the impact beam rearward about the axial end of the frame rail.

7. A vehicle as set forth in claim 1 further comprising a plate attached to the second axial end of the load transferring member.

8. A vehicle as set forth in claim 1 wherein the load transferring member is operable to transfer both a longitudinal component and a lateral component of an impact load applied to the distal end of the impact beam to the frame rail.

9. A chassis for a vehicle, the chassis comprising:
a primary support structure defining a longitudinal axis, and including a first frame rail and a second frame rail laterally offset from each other on opposing sides of the longitudinal axis, and each including a forward axial end;
an impact beam attached to the forward axial end of each of the first frame rail and the second frame rail, wherein the impact beam is disposed transverse to the longitudinal axis, and extends outboard of the first frame rail relative to the longitudinal axis to a first distal end, and outboard of the second frame rail relative to the longitudinal axis to a second distal end;
a first body panel mount attached to the first frame rail and axially spaced from the impact beam along the longitudinal axis, wherein the first body panel mount is disposed outboard of the first frame rail relative to the longitudinal axis;
a second body panel mount attached to the second frame rail and axially spaced from the impact beam along the longitudinal axis, wherein the second body panel mount is disposed outboard of the second frame rail relative to the longitudinal axis;
a first load transferring member having a first axial end attached to one of the impact beam and the first body panel mount, and a second axial end disposed adjacent to and a distance from the other of the impact beam and the first body panel mount; and
a second load transferring member having a first axial end attached to one of the impact beam and the second body panel mount, and a second axial end disposed adjacent to and a distance from the other of the impact beam and the second body panel mount;
wherein the first load transferring member extends at a first angle relative to the longitudinal axis between the impact beam and the first body panel mount, and the second load transferring member extends at a second angle relative to the longitudinal axis between the impact beam and the second body panel mount;
wherein the first load transferring member is operable to transfer both a longitudinal component and a lateral component of an impact load applied to the first distal end of the impact beam to the first frame rail, and the second load transferring member is operable to transfer both a longitudinal component and a lateral component of an impact load applied to the second distal end of the impact beam to the second frame rail; and
wherein the pre-defined distance between the second axial end of the first load transferring member and the one of the impact beam and the first body panel mount disposed adjacent the second axial end of the first load transferring member is between the range of 3 mm and 15 mm, and wherein the pre-defined distance between the second axial end of the second load transferring member and the one of the impact beam and the second body panel mount disposed adjacent the second axial end of the second load transferring member is between the range of 3 mm and 15 mm.

10. A chassis as set forth in claim 9 wherein the first angle is between the range of 30° and 45°, and wherein the second angle is between the range of 30° and 45°.

11. A chassis as set forth in claim 9 wherein the first load transferring member and the impact beam define an angle between the range 45° and 60°, and wherein the second load transferring member and the impact beam define an angle between the range 45° and 60°.

12. A chassis as set forth in claim 9 wherein the first axial end of the first load transferring member and the first axial end of the second load transferring member are each attached to the impact beam, the second axial end of the first load transferring member is disposed adjacent the first body panel mount, and the second axial end of the second load transferring member is disposed adjacent the second body panel mount.

13. A chassis as set forth in claim 9 wherein the second axial end of the first load transferring member is laterally spaced from the first frame rail 50 mm or less, and wherein the second axial end of the second load transferring member is laterally spaced from the second frame rail 50 mm or less.

14. A chassis as set forth in claim 9 wherein the first body panel mount engages the second axial end of the first load transferring member and guides the second axial end of the first load transferring member in an inboard direction relative to the longitudinal axis, toward the first frame rail, in response to an impact load applied to the first distal end of the impact beam bending the first distal end of the impact beam rearward about the axial end of the first frame rail, and wherein the second body panel mount engages the second axial end of the second load transferring member and guides the second axial end of the second load transferring member in an inboard direction relative to the longitudinal axis, toward the second frame rail, in response to an impact load applied to the second distal end of the impact beam bending the second distal end of the impact beam rearward about the axial end of the second frame rail.

15. A chassis as set forth in claim 9 further comprising a plate attached to the second axial end of each of the first load transferring member and the second load transferring member.

* * * * *